No. 827,128. PATENTED JULY 31, 1906.
G. R. WARD.
PULP MOLDING MACHINE.
APPLICATION FILED DEC. 23, 1901.
4 SHEETS—SHEET 1.
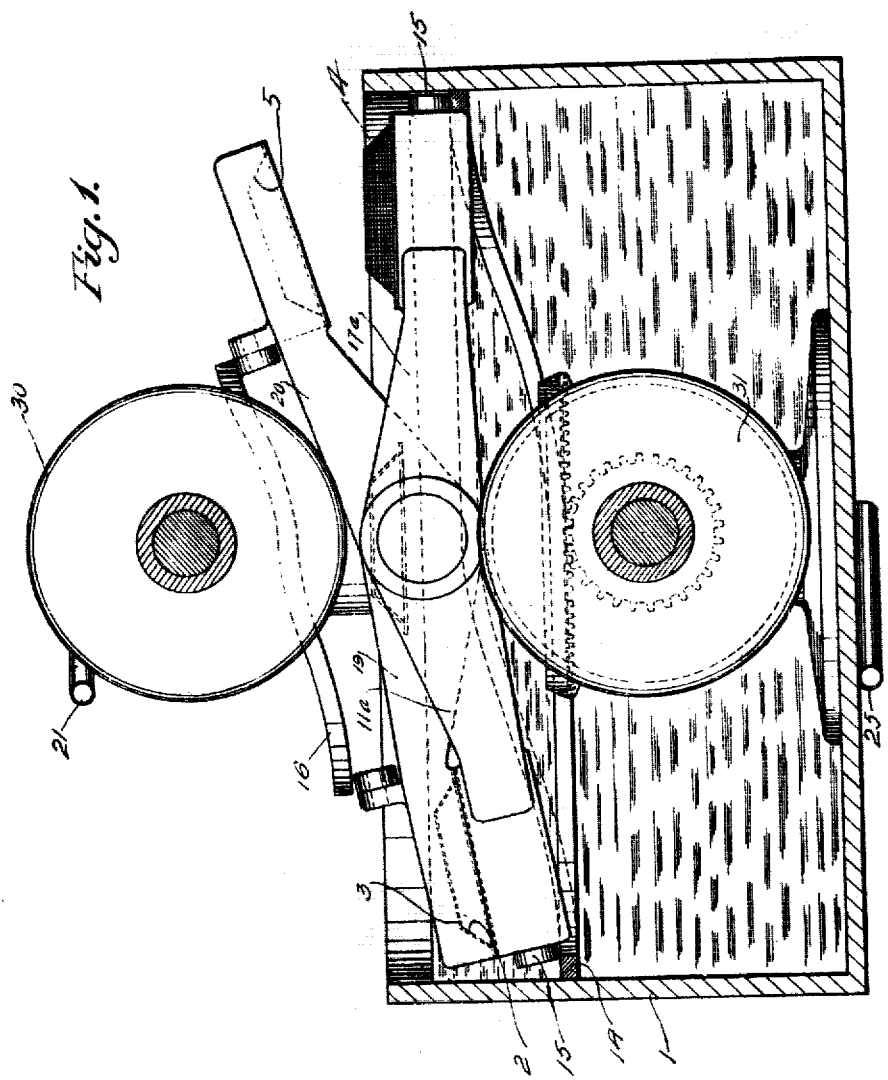
WITNESSES:
Thomas F. Hastings
M. V. Toomey
INVENTOR
Geo. R. Ward
BY
Emerson R. Newell
ATTORNEY No. 827,128. PATENTED JULY 31, 1906.
G. R. WARD.
PULP MOLDING MACHINE.
APPLICATION FILED DEC. 23, 1901.
4 SHEETS—SHEET 2.
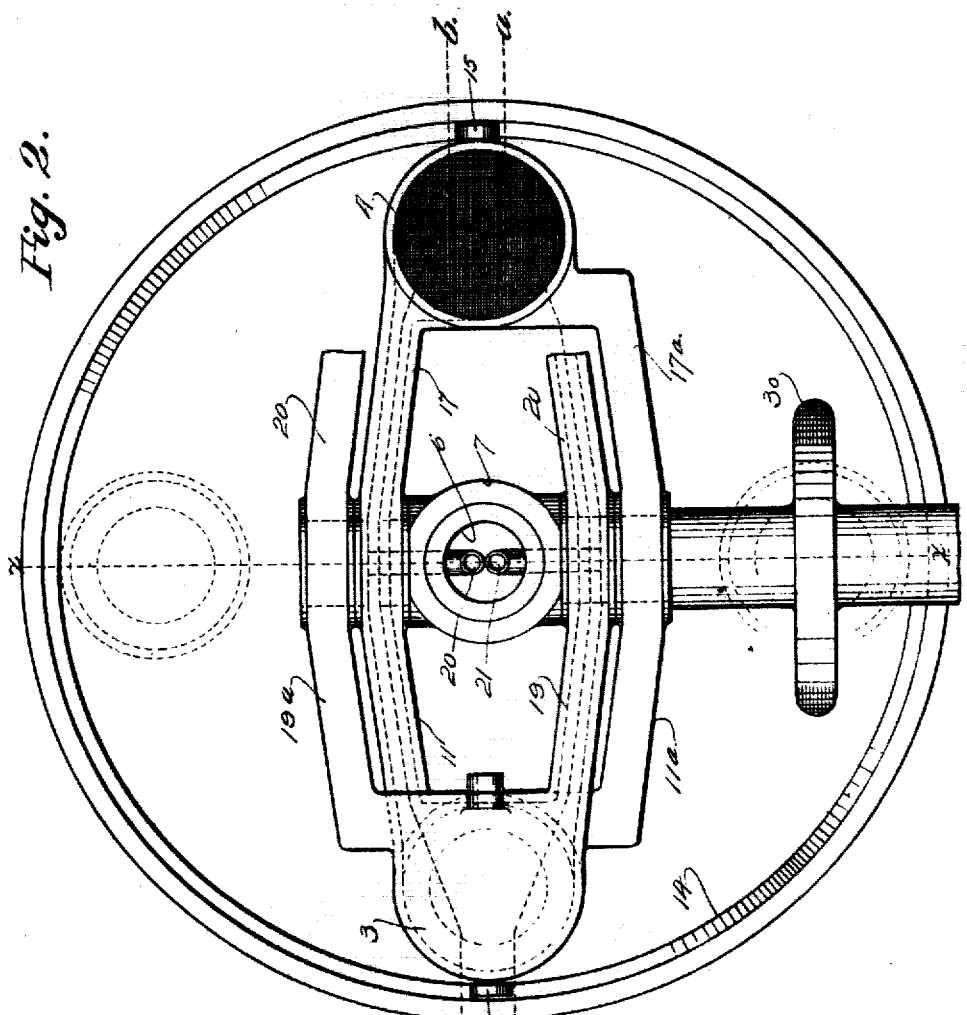
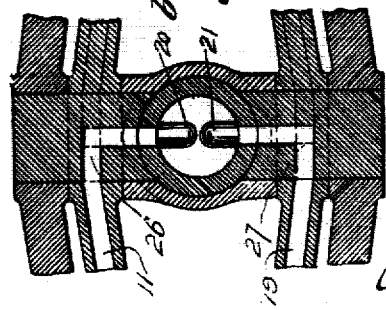
WITNESSES:
Thomas F. Hastings
M. P. Torrey
INVENTOR
Geo. R. Ward
BY
Emmons R. Newell
ATTORNEY No. 827,128. PATENTED JULY 31, 1906.
G. R. WARD.
PULP MOLDING MACHINE.
APPLICATION FILED DEC. 23, 1901.
4 SHEETS—SHEET 3.
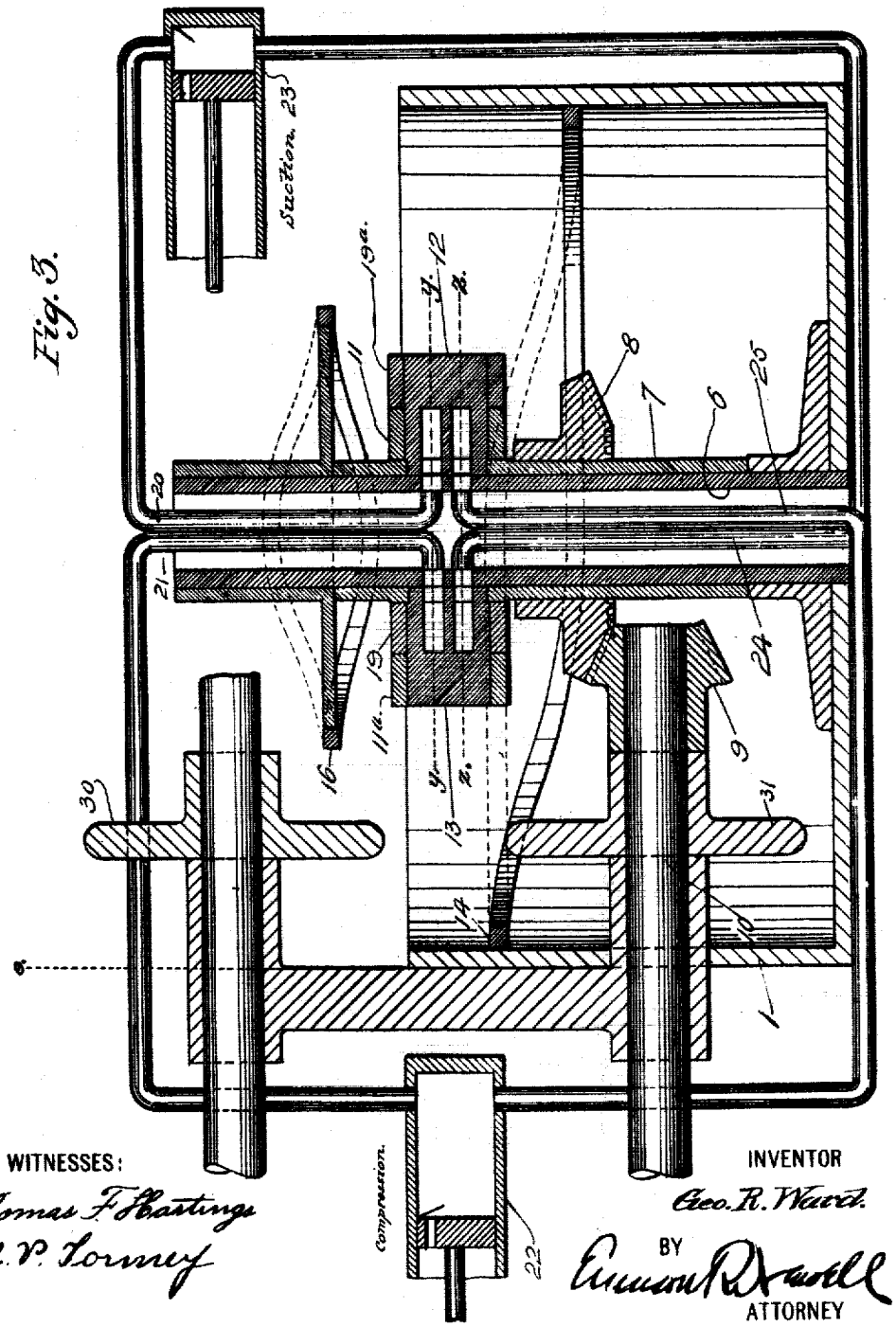

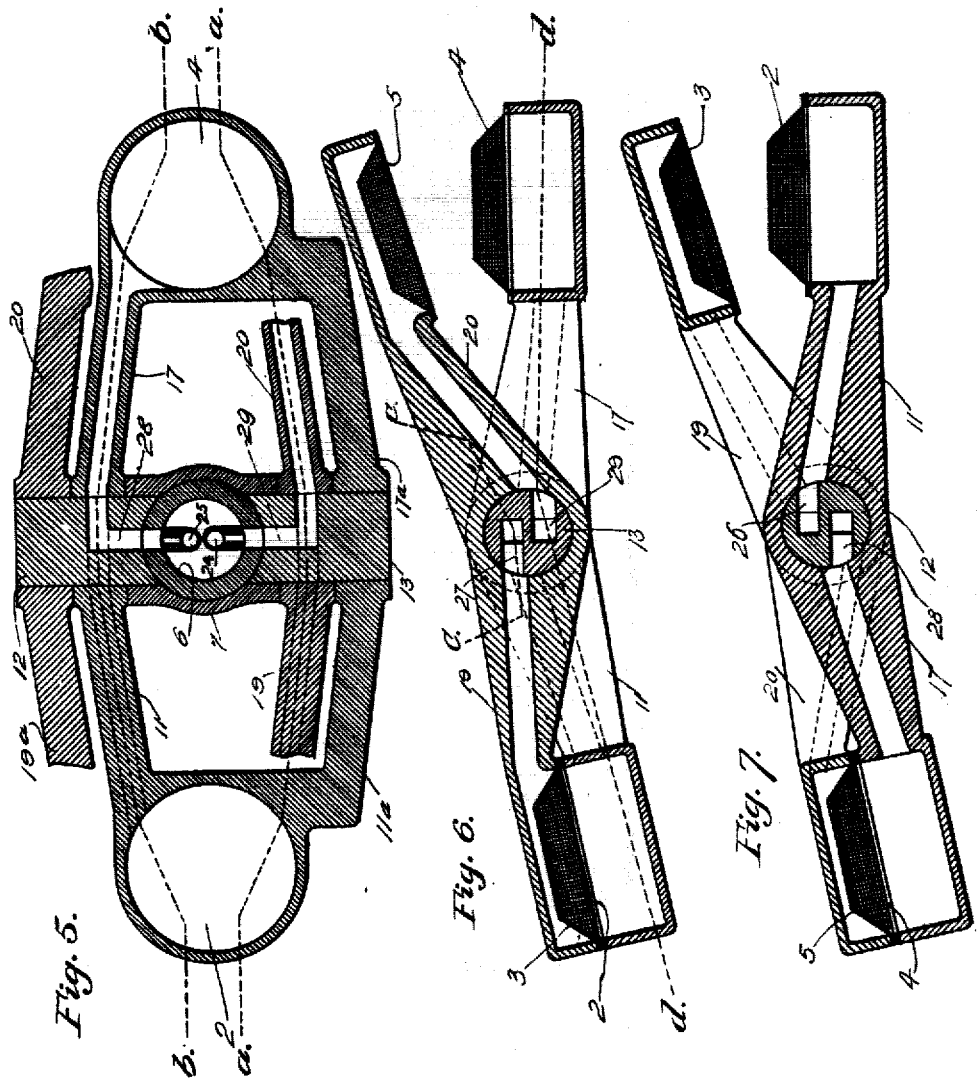

UNITED STATES PATENT OFFICE.

GEORGE R. WARD, OF NEW YORK, N. Y., ASSIGNOR, BY MESNE ASSIGNMENTS, TO THE UNION BAG & PAPER COMPANY, A CORPORATION OF NEW JERSEY.

PULP-MOLDING MACHINE.

No. 827,128.  Specification of Letters Patent.  Patented July 31, 1906.

Application filed December 23, 1901. Serial No. 86,954.

*To all whom it may concern:*

Be it known that I, GEORGE R. WARD, a citizen of the United States, residing at New York, State of New York, have invented certain new and useful Improvements in Pulp-Molding Machines, of which the following is a clear, full, and exact description.

My invention relates to pulp-molding machines, and my object is to improve the construction of the same.

My invention will be defined in the claims.

In the preferred embodiment of my invention shown in the drawings, Figure 1 shows a side elevation, the pulp-vat being in section. Fig. 2 is a plan view, the upper cam-ring and one of the upper mold-faces having been omitted. Fig. 3 is a central vertical section on line $x\,x$ of Fig. 2 looking in the direction of the arrows. Fig. 4 is an irregular substantially horizontal section on lines $y\,y$ of Fig. 3 and $c\,c$ of Fig. 6. Fig. 5 is a similar section on line $z\,z$ of Fig. 3 and $d\,d$ of Fig. 6. Fig. 6 is a vertical section on lines $a\,a$ of Figs. 2 and 5 with the omitted upper mold-faces added, and Fig. 7 is a vertical section on line $b\,b$ of Figs. 2 and 5 when the molds have been given a half-turn.

In the preferred embodiment of my invention shown in the drawings I have provided a pulp-vat 1, within which the molds move; but I do not limit myself to this construction. I prefer to provide a plurality of molds which dip in succession into the pulp in this vat to receive a layer of pulp and are then raised out of the pulp in the vat and the mold-faces compressed together to form the article.

2 3 are mold-faces preferably perforated, as shown, which form one mold, and 4 5 are similar mold-faces forming another mold. I prefer to move these molds in a substantially horizontal plane, and in the present embodiment I have shown them as rotated around a fixed pivot-shaft 6, around which turns a shaft 7, which carries the molds. Shaft 7 has suitable driving mechanism, such as a bevel-gear 8, fixed to it and meshing with a second bevel-gear on driving-shaft 10.

In order to allow mold-face 2 to be moved transversely to its plane of rotation to dip into the pulp in the vat, which is the construction I prefer, I have pivoted it, and preferably the other mold-faces also, on a pivot transverse to that of the rotating shaft 7. The lower face 2 may be fixed to an arm 11 or a pair of arms 11 11ª, which embrace shaft 7 and are pivoted on hollowed plugs or pins 12 13, which are fixed to the rotating shaft 7.

In order to cause the mold-face 2 to dip into the pulp in the vat, I have in this embodiment provided a circular cam-ring 14, on which the face 2 rides by means of a roller 15, attached thereto. The cam-ring drops at one point, (the left in Fig. 1,) so that the mold-face 3 dips into the pulp in the vat, and I prefer to provide a second cam-ring 16, which will close the faces together in the mold; but it is not necessary in all cases to actually close the mold while in the vat or even to have the upper mold-face enter the vat at all. The lower face will thus receive a layer of pulp.

In the present embodiment I have shown mold-face 2 as perforated, and I also preferably perforate the upper face 3, and I preferably use means to apply suction through the lower face 2 to cause a layer of pulp to stick to this face.

In the drawings I have shown mechanism by which air is blown through the upper mold-face and suction applied through the lower mold-face of each mold as it dips into the pulp, and when either mold reaches the opened position out of the pulp at the right in Fig. 1 a blast of air is blown through the lower face to loosen the article from that face, and I preferably also apply suction to the upper face at the same time, which will cause the dish to stick to the upper face. The lower mold-face 4 is preferably carried on extensions 17 17ª from arms 11 11ª, and arms 11 and 17 are preferably hollow and lead to the under side of the lower perforated faces. Similarly, the upper faces are carried in arms 19 19ª 20 20ª, of which 19 and 20 are hollowed. One of these pairs of arms—for instance, extensions 19 and 20—may stand at an obtuse angle to each other, so that when one mold is closed the other automatically opens, as shown in Fig. 1. The closing is automatically effected by cam-ring 16. 20 21 are pipes, the former for supplying compressed air to the upper face and the latter for applying suction to the lower face when in the vat by pumps 22 23 or other suitable devices, and, conversely, pipe 24 applies suction to the upper face and pipe 25 supplies compressed air to the lower face when the mold is out of the pulp and opened, as shown at the right in Fig. 1. This is accomplished by the valve device next described.

The plugs 12 13 rotate with sleeve 7 around the fixed pipe 6, which has a fixed and permanently open port connecting with each pipe, as shown in Fig. 3. On plane y y of Fig. 3 the plugs 12 13 have ports 26 27, as shown in Fig. 4, connecting at all times with the arms 11 and 19, leading to mold-faces 2 and 3, respectively, and on plane z z of Fig. 3 the plugs have ports 28 29 at all times in communication with the hollow arms 17 and 20, leading to the lower and upper faces 4 and 5, respectively.

It will be observed that when the parts are in the position shown in Figs. 1 and 2 the port 26 connects with pipe 20, Fig. 3, and suction is applied to lower face 2, and port 27 connects with pipe 21, supplying compressed air to upper face 3. At the same time port 28 connects with pipe 25 and compressed air is supplied to lower face 4, while port 29 connects with pipe 24, applying suction to upper face 5. (See Figs. 5 and 6.) When the molds have been given a half-turn into the position shown in Fig. 7, the arms have been slightly rocked, but not sufficiently to bring the hollowed arms out of register with the ports, as above. In this position, however, the ports connect with pipes acting in the opposite direction from before, and consequently suction is then applied to faces 4 and 3 and air is blown through faces 5 and 2. The mechanism, therefore, automatically gives the required action.

As the mold 2 3 in Fig. 1 rises from the pulp in the vat the mold 4 5 starts to descend, and mold 2 3 then passes between a compressing device, such as rollers 30 31, which compress the mold-faces together. As the molds travel farther on the cam-ring 16 in this embodiment presses down the raised mold-face 5 and closes the mold, at the same time opening the mold 2 3. As the parts reach the position shown in Fig. 7 the current of air through each mold-face (considered by itself) is obviously reversed from what it was when in the position shown in Figs. 1 and 6, because the ports 26, 27, 28, and 29 then communicate with pipes which give a current in the opposite direction from that given by the pipes formerly communicating with said ports.

The holding of the lower face in substantially a horizontal position during such up-and-down movement in the pulp is an advantage, for the reason that the pulp is deposited evenly all over the face. If the lower mold-face dipped down into the pulp in a vertical plane, one edge would be immersed in the pulp much longer than the other edge, and therefore a greater amount of pulp would be deposited on this edge which would be immersed the longer time, and the article would consequently be of irregular thickness.

In my device, however, the holding of the lower face in a substantially horizontal position during its up-and-down movement in the pulp avoids this objection and causes the layer of pulp on the mold-face to be evenly distributed. It will be obvious that this result would occur even if the two faces forming the mold were not moved transversely of such up-and-down movement.

I am aware that many variations may be made from the constructions above set forth without departing from the scope of my invention as claimed, and I therefore do not limit myself to the embodiment herein described and illustrated.

What I claim is—

1. In a pulp-machine in combination a traveling mold-face, means to move the same in a substantially horizontal plane, a pulp-vat, means to supply a layer of pulp to the under side of said face, a second mold-face, and a compressing device to press said faces together in a direction transverse to the plane of movement of said first face, to form said article.

2. In a pulp-machine in combination a traveling mold-face, means to rotate the same in a substantially horizontal plane, a pulp-vat, means to cause said face to dip into the pulp therein and receive a layer of pulp, a second mold-face, and a compressing device to press said faces together in a direction transverse to the plane of movement of said first face, to form said article.

3. In a pulp-machine in combination a traveling mold-face, means to move the same in a substantially horizontal plane, a pulp-vat, means to cause said face to dip into the pulp therein and receive a layer of pulp, a second mold-face, and a compressing device to press said faces together outside of the pulp in said vat and in a direction transverse to the plane of movement of said first face, to form said article.

4. In a pulp-machine in combination a traveling mold-face, means to move the same in a substantially horizontal plane, a pulp-vat, means to cause said face to descend into the pulp in said vat and receive a layer of pulp, a second mold-face, and a compressing device to press said faces together in a direction transverse to the plane of movement of said first face, to form said article.

5. In a pulp-machine in combination a traveling mold formed of a plurality of faces, means to move the same in a substantially horizontal plane, a pulp-vat, means to cause said mold to descend into the pulp in said vat and receive a layer of pulp therein, and a compressing device to press said faces together to form said article.

6. In a pulp-machine in combination a traveling mold formed of a plurality of faces, means to rotate the same in a substantially horizontal plane, a pulp-vat, means to cause said mold to descend into the pulp in said vat and receive a layer of pulp therein, and a compressing device to press said faces together to form said article.

7. In a pulp-machine in combination a perforated traveling mold-face, means to move the same in a substantially horizontal plane, a pulp-vat, means to supply a layer of pulp to said face, a second mold-face, a compressing device to press said faces together in a direction transverse to the plane of movement of said first face to form said article, means to separate said faces, and means to blow a current of air through said perforated face to loosen said article.

8. In a pulp-machine in combination a perforated traveling mold-face, means to move the same in a substantially horizontal plane, a pulp-vat, means to supply a layer of pulp to said face, a suction device to apply suction through said perforated face, a second mold-face, a compressing device to press said faces together in a direction transverse to the plane of movement of said first face to form said article, means to separate said faces, and means to blow a current of air through said perforated face to loosen said article.

9. In a pulp-machine in combination a traveling mold formed of a plurality of faces, means to rotate the same in a substantially horizontal plane, a pulp-vat, means to cause said mold to descend into the pulp in said vat and receive a layer of pulp therein, and a compressing device to press said faces together outside of the pulp in said vat and in a direction transverse to the plane of movement of said first face, to form said article.

10. In a pulp-machine in combination a traveling mold formed of a plurality of separable mold-faces adapted to form said article between them, means to introduce a suitable pulp into said mold, a device to automatically close the same, means to rotate said mold in a plane substantially horizontal and transverse to the direction of movement of said mold-faces in closing said mold, and means to press said mold-faces together to form said article.

11. In a pulp-machine in combination a plurality of traveling molds each formed of a plurality of separable mold-faces adapted to form said article between them, means to introduce a suitable pulp into said molds in succession, a device to automatically close said molds in succession, means to rotate said molds in a plane substantially horizontal and transverse to the plane of movement of said mold-faces in closing said mold, and means to compress said molds in succession to form said article.

12. In a pulp-machine in combination a traveling mold formed of a plurality of separable mold-faces adapted to form said article between them, a pulp-vat into the pulp in which one of said faces dips to introduce a suitable pulp into said mold, a device to automatically close the same, means to rotate said mold in a plane substantially horizontal and transverse to the direction of movement of said mold-faces in closing said mold, and means to press said mold-faces together to form said article.

13. In a pulp-machine in combination a traveling mold formed of a plurality of separable mold-faces, a pulp-vat, a substantially vertical shaft on which said mold is carried, means to rotate said shaft, means to cause said mold to dip into the pulp in said vat and rise from the same, and a compressing device to press said faces together to form said article.

14. In a pulp-machine in combination a traveling mold formed of a plurality of separable mold-faces, a pulp-vat, a substantially vertical shaft on which said mold is carried, means to rotate said shaft, a cam device to cause said mold to dip into the pulp in said vat and rise from the same, and a compressing device to press said faces together to form said article.

15. In a pulp-machine in combination a plurality of molds each comprising a plurality of separable mold-faces, connecting means between said molds to cause one mold to automatically open when the other closes, a pulp-vat, means to move said molds, and guides to cause said molds to dip into the pulp in said vat and close in succession, and a compressing device to press said mold-faces together.

16. In a pulp-machine in combination a plurality of molds each comprising a plurality of separable mold-faces, connecting means between said molds to cause one mold to automatically open when the other closes, a pulp-vat, means to rotate said molds, and guides to cause said molds to dip into the pulp in said vat and close in succession, and a compressing device to press said mold-faces together.

17. In a pulp-machine in combination a pulp-vat, a traveling mold formed of a plurality of separable mold-faces, and means to rotate said mold in a substantially horizontal plane, means to cause one of said faces to dip into the pulp in said vat and receive a layer of pulp, and means to give said faces a relative movement transversely to the plane of movement of said mold, to close said mold.

18. In a pulp-machine in combination a pulp-vat, a traveling mold formed of a plurality of separable mold-faces, means to rotate said mold in a substantially horizontal plane, a cam device to cause one of said faces to dip into the pulp in said vat and receive a layer of pulp, and a cam device to give said faces a relative movement transversely to the plane of movement of said mold, to close said mold.

19. In a pulp-machine in combination a pulp-vat, a traveling mold formed of a plurality of separable mold-faces, one of said faces being perforated, means to rotate said mold in a substantially horizontal plane, means to cause said perforated face to dip into the pulp in said vat and receive a layer of pulp, a suction device to automatically apply suction through said perforated face, means to give said faces a relative movement transversely to the plane of movement of said mold, to close said mold.

20. In a pulp-machine in combination a mold formed of a plurality of separable mold-faces, a pulp-vat, means to move said mold, and a cam-guide for each face to cause said mold to dip into the pulp in said vat and to close.

21. In a pulp-machine in combination a mold formed of a plurality of separable mold-faces, a pulp-vat, means to rotate said mold, and a cam-guide for each face to cause said mold to dip into the pulp in said vat and to close.

22. In a pulp-machine in combination a plurality of molds each formed of a plurality of separable mold-faces, connecting means between said molds to cause one to open as the other closes, a pulp-vat, means to move said molds, and a cam-guide for each face to cause said molds to dip in succession into the pulp in said vat and to close.

23. In a pulp-machine in combination a mold formed of a plurality of separable mold-faces, a pulp-vat, means to move said mold, and a cam-guide for each face to cause said mold to dip into the pulp in said vat and to close together by a relative movement transverse to the plane of movement of said mold.

24. In a pulp-machine in combination a plurality of molds each formed of a plurality of separable perforated mold-faces, connecting means between said molds to cause one to open as the other closes, a pulp-vat, means to rotate said molds, a cam-guide for each face to cause said molds to dip in succession into the pulp in said vat, and to close, means to apply suction through one of said perforated faces of one of said molds as it closes, and means to blow a current of air through one of the faces of the other mold at the same time.

25. In a pulp-machine in combination a mold formed of a plurality of separable mold-faces, a pulp-vat, means to rotate said mold in a substantially horizontal plane, a cam-guide for each mold-face adapted to cause one of said faces to dip into the pulp in said vat to receive a layer of pulp and raise the same from said pulp, and a compressing device to press said faces together.

26. In a pulp-machine in combination a mold formed of a plurality of separable mold-faces, a pulp-vat, means to rotate said mold in a substantially horizontal plane, a cam-guide for each mold-face adapted to cause said mold to dip into the pulp in said vat to receive a layer of pulp and raise the same from said pulp, and a compressing device to press said faces together.

27. In a pulp-machine in combination a pulp-vat, a traveling mold formed of a plurality of separable faces, a rotatable shaft carrying said mold, one of said mold-faces being pivoted on a pivot transverse to said shaft, means to cause said face to dip into the pulp in said vat and receive a layer of pulp, and means to press said faces together to form said article.

28. In a pulp-machine in combination a pulp-vat, a traveling mold formed of a plurality of separable faces, a rotatable shaft carrying said mold, said mold-faces being pivoted on a pivot transverse to said shaft, means to cause one of said faces to dip into the pulp in said vat and receive a layer of pulp, and means to press said faces together to form said article.

29. In a pulp-machine in combination, a pulp-vat, a plurality of traveling molds, means to rotate said molds on a pivot to cause them to follow each other in succession, said molds being hung on a second pivot transverse to said first pivot, means to cause one mold to open as the other closes, and guiding devices adapted to cause said molds to rock on said second pivot and dip into the pulp in said vat and rise therefrom in succession.

30. In a pulp-machine in combination a pulp-vat, a plurality of traveling mold-faces, a rigid connection between said faces, means to rotate said faces on a pivot to cause them to follow each other in succession, said faces being hung on a second pivot transverse to said first pivot, and guiding devices adapted to cause said faces to rock on said second pivot and dip into the pulp in said vat and rise therefrom in succession.

31. In a pulp-machine in combination a pulp-vat, a plurality of traveling molds, means to rotate said molds on a substantially vertical pivot to cause them to follow each other in succession, said molds being hung on a second pivot transverse to said first pivot, means to cause one mold to open as the other closes, and guiding devices adapted to cause said molds to rock on said second pivot and dip into the pulp in said vat and rise therefrom in succession.

32. In a pulp-machine in combination a pair of traveling mold-faces, means to rotate the same around a pivot, an arm carrying said faces and hung on a pivot transverse to said first pivot and between said faces, an arm also hung on a transverse pivot and carrying a second pair of mold-faces coöperating with said first faces to form a pair of molds, the ends of one of said arms lying at an obtuse angle whereby when the mold-faces of one of said molds are pressed together the other mold is opened, means to introduce a suitable pulp into said molds, and a pressing device to successively press the faces of said molds together.

33. In a pulp-machine in combination a pair of traveling mold-faces, means to rotate the same around a pivot, an arm carrying said faces and hung on a pivot transverse to said first pivot and between said faces, an arm also hung on a transverse pivot and carrying a second pair of mold-faces coöperating with said first faces to form a pair of molds, the ends of one of said arms lying at an obtuse angle whereby when the mold-faces of one of said molds are pressed together the other mold is opened, a pulp-vat, and means to cause the faces on one of said arms to dip into the pulp in said vat, and a pressing device to successively press the faces of said molds together.

34. In a pulp-machine in combination, a pulp-vat, a mold consisting of an upper and a lower nesting-face adapted to be pressed together, said lower face being perforated, means to cause a relative movement between said vat and said lower face to immerse said face in the pulp and free it therefrom, said lower face being held substantially horizontal during said relative movement, a suction device which applies suction through said lower face when so immersed to deposit a layer of pulp thereon, said upper face being located above said lower face.

35. In a pulp-machine in combination, a pulp-vat, a mold consisting of an upper and a lower nesting face adapted to be pressed together, said lower face being perforated, means to cause said lower face to sink down into the pulp and rise therefrom, said lower face being held substantially horizontal during its up-and-down movement, a suction device which applies suction through said lower face when so immersed to deposit a layer of pulp thereon, said upper face being located above said lower face whereby said faces are pressed together when said lower face rises.

36. In a pulp-machine in combination, a pulp-vat, a mold consisting of an upper and a lower nesting face adapted to be pressed together, said lower face being perforated, means to cause said lower face to sink down into the pulp and rise therefrom, said lower face being held substantially horizontal during its up-and-down movement, a suction device which applies suction through said lower face when so immersed to deposit a layer of pulp thereon, said upper face being located above said lower face so as to at all times register therewith, whereby said faces are pressed together when said lower face rises.

37. In a pulp-machine in combination, a receptacle for containing a suitable pulp, a perforated mold-face adapted to dip into said pulp, a suction device acting through said perforated face to deposit a layer of pulp thereon, a second mold-face located above said first face and receptacle, and means to move said first face out of said pulp and press said faces together to form the article.

38. In a pulp-machine in combination, a receptacle for containing a suitable pulp, a perforated mold-face adapted to dip into said pulp, a suction device acting through said perforated face to deposit a layer of pulp thereon, a second mold-face located above said first face and receptacle, and means to move said first face out of said pulp and press said faces together to form the article, and a suction device acting through said second face to transfer said article to said second face.

Signed at New York, N. Y., this 17th day of December, 1901.

GEORGE R. WARD.

Witnesses:
EMERSON R. NEWELL,
THOMAS F. HASTINGS.